United States Patent [19]

Vachon

[11] Patent Number: 4,480,368
[45] Date of Patent: Nov. 6, 1984

[54] UNITARY INSTALLATION OF ENGINE CYLINDER LINER, PISTON AND ROD

[75] Inventor: Louis F. Vachon, Washington, Ill.

[73] Assignee: Caterpillar Tractor Co., Peoria, Ill.

[21] Appl. No.: 490,941

[22] Filed: May 2, 1983

[51] Int. Cl.³ .................. B23P 15/00; B65D 85/68
[52] U.S. Cl. .................. 29/156.4 WL; 29/156.5 R; 29/282; 29/428; 29/DIG. 44; 92/128; 123/1 R; 123/41.84; 123/195 R; 123/198 R; 138/89; 206/318; 206/335
[58] Field of Search ............ 29/156.4 WL, 156.5 R, 29/282, 434, 428, DIG. 44; 92/128; 123/41.84, 198 R, 195 R, 1 R; 206/318, 335; 138/89 R, 89.3, 89.4

[56] References Cited

U.S. PATENT DOCUMENTS

| 1,008,237 | 11/1911 | Bretherton | 138/89 X |
| 3,168,081 | 2/1965 | Bauer | 123/41.84 X |
| 3,358,869 | 12/1967 | Palmer et al. | 138/89 X |
| 3,899,100 | 8/1975 | Rigaud | 206/318 X |
| 4,370,788 | 2/1983 | Baker | 29/156.4 WL |
| 4,399,783 | 8/1983 | Hauser, Jr. | 123/41.84 X |

OTHER PUBLICATIONS

3500 Industrial Engines, (Disassembly and Assembly), Form No. SENR2573, Caterpillar Tractor Co., (Mar. 1982).
Detroit Diesel Engines, Series 149 Service Manual, Form No. 6SE285, (Rev. 1/1976), Section 1.6.3, General Motors Cong., (Oct. 1975).

Primary Examiner—Charlie T. Moon
Assistant Examiner—Ronald S. Wallace
Attorney, Agent, or Firm—William B. Heming

[57] ABSTRACT

To service an engine (10), it is frequently determined that a cylinder liner (12) and piston (18) must be replaced. It is difficult and time consuming to first install the liner (12) and then the piston (18) with the rings (20) and connecting rod (22). A pre-assembled unit (36) including the liner (12) and piston (18) may be installed on the engine according to a disclosed method. The unitary assembly simplifies steps at the service facility and, if desired, permits assembly of the unit (36) prior to shipment to the service facility to reduce shipping space and cost.

6 Claims, 2 Drawing Figures

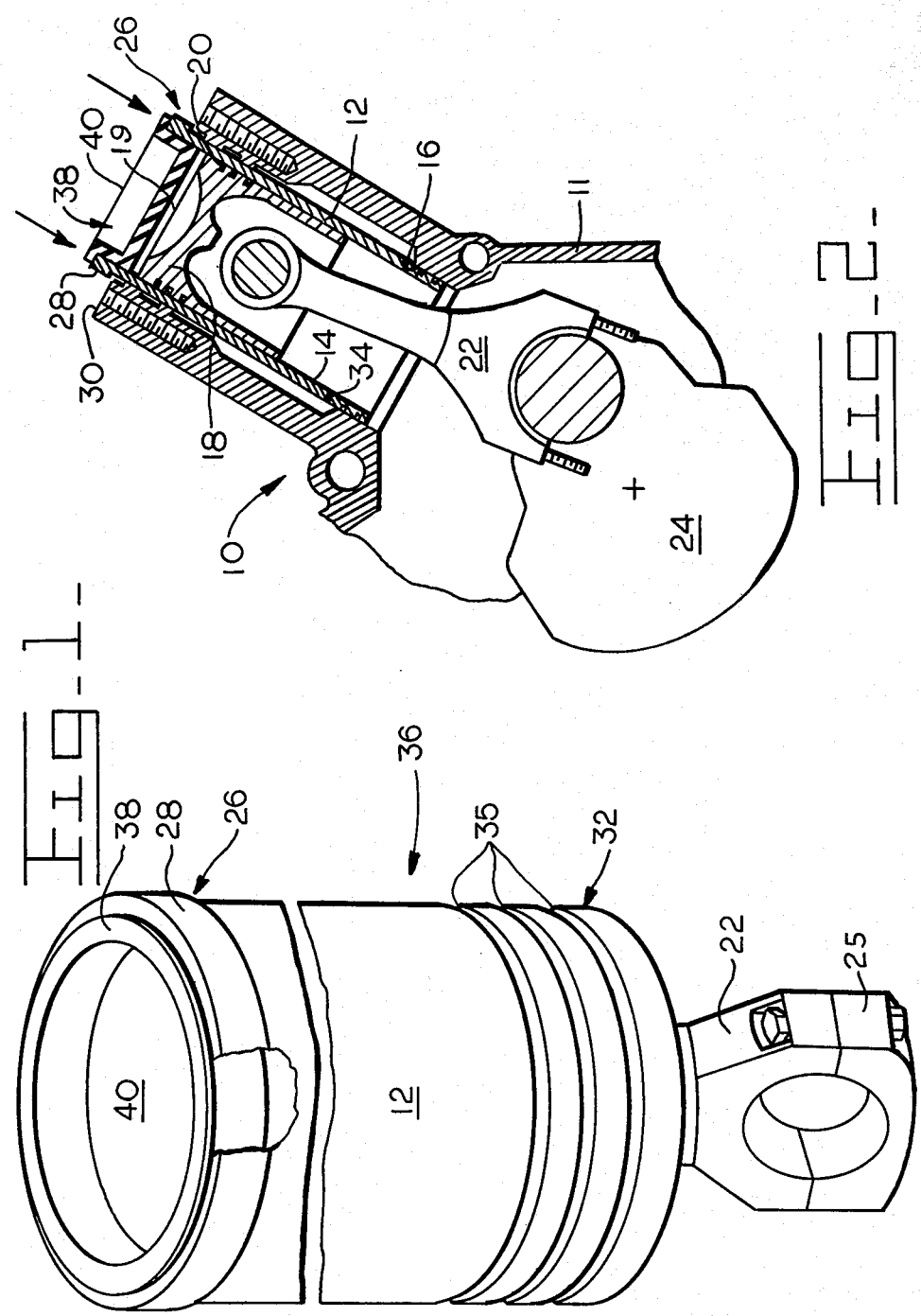

UNITARY INSTALLATION OF ENGINE CYLINDER LINER, PISTON AND ROD

Description

TECHNICAL FIELD

The invention relates to installing a cylinder liner, piston, ring and rod into an engine, and more particularly the invention relates to a method for installing such engine components as a unit.

BACKGROUND ART

Internal combustion engine sometimes utilize cylinder liners which define the cylinder bores in which the pistons reciprocate. Operation of the engine, particularly the combustion process, may cause wear or damage to the engine making it necessary to remove and replace a cylinder liner and its associated piston.

Heretofore, it has been the practice to replace those components in individual steps. This generally has involved inserting a new cylinder liner into the block, followed by inserting the piston with rings and connecting rod in place.

The above multi-step procedure has proven to be time consuming and inconvenient. Fitting the individual components tends to require more labor than if they could first be assembled in their operational relationship away from the engine and then installed. Correspondingly, the individual components are most often shipped separately which requires greater shipping space than if shipped assembled and increases costs of shipment.

The present invention is directed to overcoming one or more of the above problems.

DISCLOSURE OF THE INVENTION

In one aspect of the present invention, a method is employed for installing a cylinder liner, piston, ring and connecting rod as a unit into an engine block. The method includes assembling the cylinder liner, piston, ring and connecting rod into their operational relationship to form a unit. A cap is positioned on the head end of the cylinder liner and at least a partial vacuum is established between the cap and piston sufficient to maintain the piston and connecting rod in the cylinder liner when unsupported. Following these steps, the unit is inserted into the engine block and the cap is removed from the cylinder liner.

In another aspect of the present invention, a unit for an engine has a cylinder liner, a piston positioned in a bore of the liner and a piston rod pivotally connected to the piston. A cap covers the cylinder bore and is sealed against the liner and constructed to withstand at least a partial vacuum between the piston and cap with the piston and rod being otherwise unsupported in the cylinder liner.

The unit may be easily and quickly inserted into the engine because the vacuum supports the piston in place during the work. Unitary assembly obviates the time consuming operations of individually assembling the components on the engine, plus the unit is less bulky and costly to ship to assembly locations.

BRIEF DESCRIPTION OF THE DRAWINGS

FIG. 1 shows a cylinder liner, piston, rings and rod assembled with a cap into a unit which illustrates one embodiment of the present invention; and FIG. 2 shows a step in assembling the unit of FIG. 1 into an engine which illustrates an embodiment of the method of the present invention.

BEST MODE FOR CARRYING OUT THE INVENTION

Referring to the drawings, and particularly to FIG. 2, a portion of an internal combustion engine 10 is shown which illustrates a "cylinder" of the engine. The engine has a block 11 and a cylinder liner 12 having a bore 14 therethrough. The liner is sized for a "pilot" fit into an opening 16 in the block. The bore defines the cylinder bore of the engine in which is positioned for reciprocal movement a piston 18 with a top surface 19 and rings 20 about its perimeter. The piston is pivotally connected by conventional means to a connecting rod 22 which is in turn connectable to a crankshaft 24 by conventional rod cap 25 shown in FIG. 1.

In the particular engine 10 shown, a head end 26 of the cylinder liner 12 has a flange 28 which abuts the top surface 30 of the block 10 when the liner is in place in the engine. The cylinder liner also has a rod end 32 through and from which the piston rod 22 extends. About the outer perimeter of the liner are O-rings 34 (FIG. 2) positioned in grooves 35 on the liner. The O-rings establish an interference fit between the liner and the block.

Referring specifically now to FIG. 1, shown is a unit 36 to facilitate engine assembly or engine servicing where the liner 12 and piston 18 replacement are desirable. The unit has the cylinder liner, piston and ring or rings 20 (not visible) and connecting rod 22 assembled in their "operational" relationship one with the other. The O-rings 34 will also be assembled as part of the unit prior to engine installation. The rod cap 25 is shown assembled on the unit for shipping purposes but will normally be removed during installation of the unit on the engine 10. A cap 38, such as plug 40 inserted into the cylinder bore 14, is positioned on and covers the head end 26 of the liner. A diametrically expandable plug or a covering which simply extends across the end of the liner may also be used. The "seal" of the cap to the liner must be able to be made air-tight and the cap is of a construction sufficient to withstand a partial vacuum as discussed below.

With the use of an air-tight cap 38, at least a partial vacuum can be established in the cylinder bore 14 between the cap and piston 18 which is sufficient to maintain or hold the piston in place in the cylinder liner when the piston, ring or rings 20 and rod 22 are otherwise unsupported. It has been found that conditions for a sufficient vacuum are established if the piston is positioned in the cylinder bore such that the cap is closely adjacent or in contact with the top surface 19 of the piston when the cap is placed in position. With the cap in place and the cylinder liner 12 lifted without holding the piston or rod in place, the piston tends to move downwardly in the bore. This action establishes a partial vacuum such that the downward movement of the piston is resisted and only slight movement occurs.

The cap 38 may also be first installed on the cylinder liner 12 and the piston 18 and other components subsequently added. However, because this may make it difficult to insert the piston with rings 20 into the liner, the air-tight sealing of the cap to the liner may have to be delayed or a cap air relief mechanism utilized until the piston can be properly positioned.

The unit 36 may be held by or at the liner 12 or cap 38 if of proper construction and inserted into the opening 16 in the engine block 11 with the piston 18, rings 20 and rod 22 being maintained in position in the liner 12 by the vacuum. The vacuum is then released such as by removing the cap 38. The piston is now movable in the liner as necessary to allow the rod to be connected to the crankshaft 24, and the liner may be seated on the block for completing installation.

INDUSTRIAL APPLICABILITY

It is believed the method of installing the described unit 36 into the engine block 11 is evident from the above. However, a brief discussion follows so that one may more fully appreciate the advantages of servicing an engine in the disclosed manner.

The initial step of assembling the unit 36 is straight forward. It is believed one will appreciate that the unit can be assembled at a factory or central supply facility which will save shipping space and therefore costs. It is also preferred that the cap 38 be positioned in place at the same time. Its presence will prevent foreign matter from entering the top of the cylinder liner during handling. Prior to installation, the O-rings must be added if not on the unit and it is desirable to remove the rod cap 25 if present.

For the engine 10 shown, inserting the unit 36 most of the way into the block 11 is relatively simple as the cylinder liner 12 and block are sized for a "pilot" fit. It is desirable to guide the free end of the rod so that it will not interfere with the crankshaft 24. However, it will not be necessary to support the piston 18 or connecting rod 22 as the vacuum performs that function.

The cap is removed to relieve the vacuum, and the piston 18 may be freely moved as necessary to enable connection of the rod 22 with the crankshaft 24 by the rod cap 25 as is known in the art. The liner 12 is finally moved into place or seated by settling the flange 28 into its mating opening in the top surface 30 of the block 10. Resistance by the O-rings 34 may be overcome by using a tool to press the liner into position or by tapping the liner. Where necessary, the O-rings may be lubricated to reduce interference. During movement of the liner, the piston will move in the liner being supported by the rod connection with the crankshaft. The operation can be seen to be a simple one which can greatly reduce time and cost in both supply of the components and servicing of the engine.

Other aspects, objects and advantages will become apparent from a study of the specification, drawings and appended claims.

I claim:

1. A method for installing a cylinder liner (12), piston (18), ring (20) and connecting rod (22) as a unit (36) into a cylinder bore (16) of an engine block (11) comprising the steps of:
   assembling the cylinder liner (12), piston (18), ring (20) and connecting rod (22) into their operational relationship one with the other to form the unit (36);
   positioning a cap (38) on the head end (26) of the cylinder liner (12);
   establishing at least a partial vacuum between the cap (38) and piston (18) sufficient to maintain the piston (18) and connecting rod (22) in place in the cylinder liner (12) when unsupported;
   inserting the unit (36) into the cylinder bore (16) of the engine block (11) in a fixed position; and
   removing the cap (38) from the cylinder liner (12) while the cylinder liner (12) is in the cylinder bore (16).

2. The method, as set forth in claim 1, wherein the step of positioning the cap (38) includes inserting a plug (40) into the bore (14) of the cylinder liner (12).

3. The method, as set forth in claim 1, wherein the step of assembling the cylinder liner (12), piston (18), ring (20) and connecting rod (22) includes positioning the top surface (19) of the piston (18) at a location in the cylinder liner (12) so that the cap (38) is closely adjacent the top surface (19) of the piston (18) when the cap (38) is in position.

4. The method, as set forth in claim 3, wherein positioning the top surface (19) of the piston (18) closely adjacent the cap (38) places the top surface (19) and cap (38) in contact one with the other.

5. A method for installing a cylinder liner (12), piston (18), ring (20) and connecting rod (22) as a unit (36) into a cylinder bore (16) of an engine block (11), comprising the steps of:
   positioning a cap (38) on the head end (26) of the cylinder liner (12);
   assembling the cylinder liner (12), piston (18), ring (20) and connecting rod (22) into their operational relationship one with the other to form the unit (36);
   establishing at least a partial vacuum between the cap (38) and piston (18) in the cylinder liner (12) sufficient to maintain the piston (18) and connecting rod (22) in place in the cylinder liner (12) when unsupported;
   inserting the unit (36) into the cylinder bore (16) of the engine block (11) in a fixed position; and
   removing the cap (38) from the cylinder liner (12) while the cylinder liner (12) is in the cylinder bore (16).

6. A unit for an engine (10), comprising:
   a cylinder liner (12) having a head end (26), a rod end (32) and a bore (14) therethrough;
   a piston (18) having a ring (20) thereon and being positioned in said bore (14) in said cylinder liner (12);
   a connecting rod (22) pivotally connected to said piston (18) and extending through said bore (14) from said rod end (32) of said cylinder liner (12);
   a cap (38) positioned on said cylinder bore (14) at said head end (26) of said cylinder liner (12) and being sealed against said cylinder liner (12) and constructed to withstand at least a partial vacuum in the cylinder bore (14) between said piston (18) and cap (38) with said piston (18) and connecting rod (22) being otherwise unsupported in the cylinder liner (12).

* * * * *